UNITED STATES PATENT OFFICE.

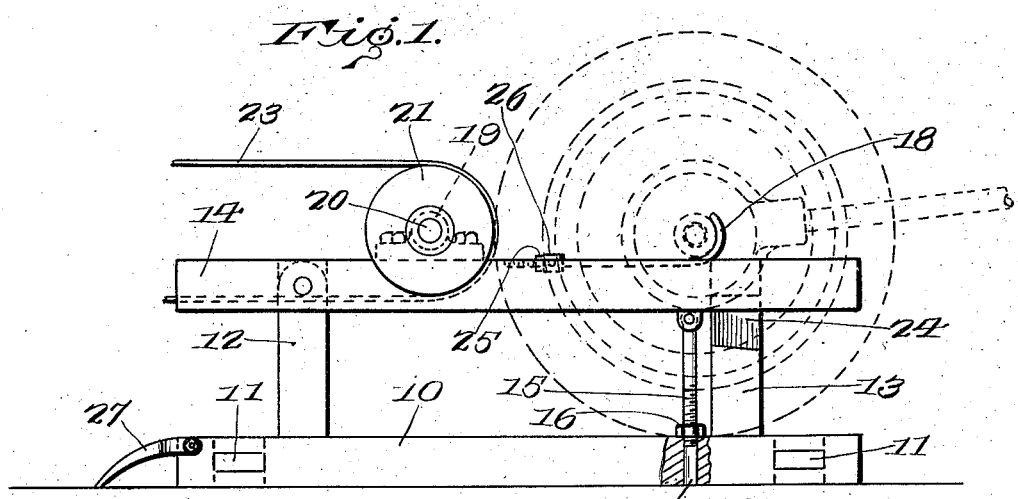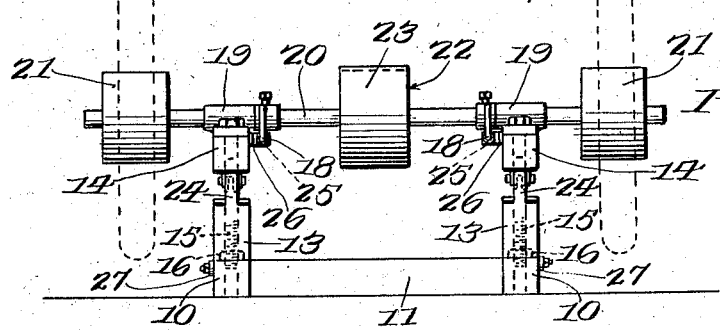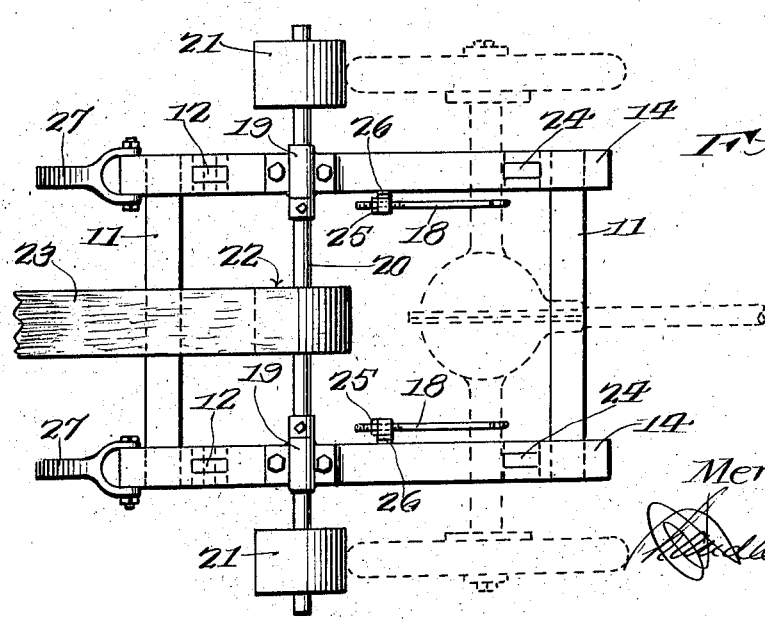

MERLE E. McCASLIN, OF EVANS CITY, PENNSYLVANIA.

POWER-TRANSMISSION MECHANISM.

1,402,627.  Specification of Letters Patent.  Patented Jan. 3, 1922.

Application filed April 18, 1921. Serial No. 462,279.

*To all whom it may concern:*

Be it known that I, MERLE E. MCCASLIN, a citizen of the United States, residing at Evans City, in the county of Butler, State of Pennsylvania, have invented certain new and useful Improvements in Power Transmission Mechanisms; and I do hereby declare the following to be a full, clear, and exact description of the invention, such as will enable others skilled in the art to which it appertains to make and use the same.

This invention relates to new and useful improvements in power mechanism and particularly to devices for obtaining power from the rear wheels of an automobile for driving various machinery.

One object of the invention is to provide a stand onto which the rear portion of an automobile may be run, and the automobile elevated to raise the wheels from the ground for driving engagement with a power receiving shaft carried by the stand.

Another object is to provide a novel means for holding the automobile against movement on the stand while driving a piece of machinery, through the medium of a driving belt.

Another object is to provide means for raising and lowering the stand for the purpose of elevating and lowering the automobile.

Other objects and advantages will be apparent from the following description when taken taken in connection with the accompanying drawing.

In the drawing:

Figure 1 is a side elevation of the invention in operation.

Figure 2 is an end view of the same.

Figure 3 is a top plan view of the device.

Referring particularly to the accompanying drawing, there is shown a floor or ground frame including the longitudinal parallel side bars 10 and the transverse connecting bars 11. Erected on the side bars 10, are the vertical posts 12 and 13, the former being of greater length than the latter, as clearly seen in the side elevation, Figure 1. Disposed above each of the side bars 10, and extending longitudinally thereof, are the bars 14, each of which is pivotally connected to the upper end of one of the longer posts 12. In normal lowered position, the bars 14 rest on the upper end of the shorter posts 13. Pivotally connected to each of the bars 14, adjacent a short post 13, is the upper end of a bolt 15, the lower end of each bolt being threaded through a nut 16 and through a vertical opening 17 formed in the bar 10. By rotating the nuts 16 the bars 14 can be raised and lowered.

Pivotally mounted on the inner side of each bar 14 is a longitudinally extending hook arm 18 which is adapted to engage with the rear axle of the automobile to prevent movement of the automobile from the stand, under the strain of the driving belt.

On the upper face of each of the bars 14, and at points intermediate their lengths, is secured a bearing bracket 19, and rotatably supported in these brackets is a transverse shaft 20. This shaft projects outwardly of the sides of the bars 14, and on each end has secured a power wheel 21 in which the tires of the rear wheels of the automobile are disposed, and which are friction driven by said tires.

On the intermediate portion of the shaft 20 is secured a power transmitting wheel 22, around which is engaged the belt 23 for conveying power to a machine to be driven.

The upper ends of the shorter posts 13 are formed with the tenons 24 which are slidably received in the mortises in the bars 14, said tenons being of such length as to remain in the mortises at all times, whether the bars are raised or lowered. Thus any transverse connecting means between the bars 14 is obviated.

The inner ends of the hook arms 18 are threaded and have thereon the nuts 25 which bear against the brackets 26, for the purpose of adjusting the arms longitudinally.

In the use of the device, the bars 14 being in lowered position, the automobile is backed into position where its rear axle is over the bars. The hook arms 18 are then engaged with the axle, and the nuts 16 are rotated to elevate the bars 14, and thus raise the rear of the automobile to dispose its wheels out of contact with the ground. This raising of the bars 14 also causes the tires of the wheels to rest against the faces of the wheels 21, and upon drawing the hooks 18, by means of the nuts 25, the rear wheels of the automobile will be held in firm contact with the wheels 21. Thus, when the engine of the automobile is set in motion the rear wheels will drive the shaft 20, through contact with the power wheels 21.

Pivotally connected to corresponding ends of the lower bars 10 are the ground piercing stop members 27, which serve to prevent longitudinal sliding movement of the device due to the tendency of the transmission belt to pull the same.

What is claimed is:

1. A power device comprising an automobile supporting stand including a base, uprights on the base, automobile elevating bars movably connected with certain of the uprights and slidably engaged with the other uprights, means for raising and lowering said bars, and axle engaging means on the bars for holding the wheels of an automobile in driving position.

2. A power device consisting of a stand, pivoted bars carried by the stand for engagement beneath the rear axle of an automobile, means for moving the bars to raise and lower an automobile, a power shaft on the bars, friction wheels of the shaft for engagement by the wheels of the automobile, hook arms on the bars for engagement with the axle of the automobile to hold the wheels in engagement with the friction wheels, and a power transmitting wheel on the shaft.

In testimony whereof, I affix my signature, in the presence of two witnesses.

MERLE E. McCASLIN.

Witnesses:
JACOB H. REINHART,
GEORGE G. FOEHRINGER.